Patented Mar. 14, 1950

2,500,486

UNITED STATES PATENT OFFICE 2,500,486

PREPARATION OF MIXED MERCAPTAL-ACETALS

John W. Copenhaver, Easton, Pa., assignor to General Aniline & Film Corporation, New York, N. Y., a corporation of Delaware No Drawing. Application December 28, 1946, Serial No. 719,114

13 Claims. (Cl. 260—609)

This invention relates to a method of preparation of mixed mercaptal-acetals, including mixed mercaptol ketals of oxocarbonylic compounds containing two oxocarbonylic groups.

I have discovered that mercaptal-acetals of oxocarbonylic compounds of this type can be prepared by reacting $\alpha,\beta$-ethylenically-unsaturated ethers with orthothioesters and mixed oxygen and sulfur orthoesters in the presence of an acid-reacting condensing agent as the catalyst, as more fully described below.

The invention is generically applicable to the reaction of open-chain $\alpha,\beta$-ethylenically-unsaturated ethers of the formula:

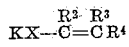

with orthoesters of the formula:

wherein $R^2$, $R^3$ and $R^4$ stand for hydrogen or an alkyl, aryl or alkaryl group; Q is hydrogen or hydrocarbon, preferably alkyl and more preferably lower alkyl; X is a chalcogen of atomic weight less than 33, i. e., oxygen or sulfur, with the proviso that at least one of the X's is sulfur; the K's are radicals of an alcohol or phenol, e. g., aliphatic, aromatic, alicyclic radicals including oxygen and sulfur-interrupted aliphatic hydrocarbon radicals, or two of the K's in the orthoester may together be a radical of a polyhydric alcohol, polythiol or a mercaptoalcohol, in the presence of acid-reacting condensing agents. The course of the reaction is illustrated by the following general equation:

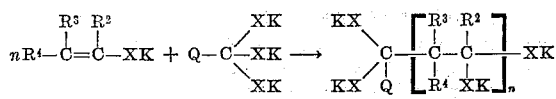

where $n$ is an integer ranging from 1–5 and preferably is unity, the R's, K's, X's and Q are defined as above.

While this invention is at present of considerable interest for the production of mixed mercaptal-acetals of 1,3-oxocarbonylic compounds such as malondialdehyde, by reacting an orthothioformic ester with a vinyl ether of the type:

wherein R is an alkyl, aryl or alkaryl group and X is a chalcogen of atomic weight less than 33, it will be apparent that by selection of the particular orthoester and $\alpha,\beta$-ethylenically-unsaturated ether employed in practicing the present invention, a wide variety of mixed mercaptal-acetals of a large number of other oxocarbonylic compounds containing two oxocarbonylic groups can be prepared, if desired. Thus, this invention is generically applicable to the reaction of $\alpha,\beta$-ethylenically-unsaturated ethers, including $\alpha,\beta$-ethylenically-unsaturated thioethers, with orthotrithioesters, orthodithioesters and orthomonothioesters of formic, acetic, propionic, butyric, benzoic, phenylacetic acids and the like, with alcohols and thiols such as methyl alcohol, ethyl alcohol, allyl alcohol, the butyl alcohols, cyclohexyl alcohol, benzyl alcohol, ethylene glycol, propylene glycol, butylene glycol, phenol, the cresols, methyl mercaptan, ethyl mercaptan, butyl mercaptan, thiophenol, thiocresol, ethanedithiol, mercaptoethanol and the like.

Likewise, in the preparation of mixed mercaptal-acetals of oxocarbonylic compound containing two oxocarbonylic groups, a wide variety of $\alpha,\beta$-ethylenically-unsaturated ethers including the $\alpha,\beta$-ethylenically-unsaturated thioethers may be employed. As examples of open-chain $\alpha,\beta$-ethylenically-unsaturated ethers which may be employed in practicing the present invention, there may be employed the ethyl-, methyl-, propyl-, isopropyl-, isobutyl-, dodecyl-, phenyl-, benzyl-, vinyl-, isopropenyl-, $\beta$-methoxyethyl- and $\beta$-methylthioethyl-ethers of such $\alpha,\beta$-ethylenically-unsaturated alcohols such as vinyl-, isopropenyl-, butenyl-, $\alpha$-phenylvinyl- and $\beta$-phenylvinyl-alcohol and their sulfur analogs. The $\alpha,\beta$-ethylenically-unsaturated oxygen ethers are preferred since they react more readily. It is apparent that, when an oxygen ether is reacted with an orthothioester of the formula

wherein Q, X and K are defined as above, the product will contain, in addition to at least one sulfur atom, at least one oxygen atom.

The catalyst employed in practicing the present invention is, as mentioned, an acid-reacting condensing agent. As examples of suitable catalysts there may be mentioned such acid-reacting condensing agents as boron trifluoride and its complexes with ether, boron trichloride, stannic chloride, titanium chloride, sulfuric acid and the like. The amount of catalyst is not highly critical and may be varied from mere traces to about 0.1 mol of catalyst per mol of the orthoester. However, for best results, employing a catalyst like boron trifluoride, amounts within the range of 0.0001 to 0.01 mol of catalyst per mol of the orthoester are employed.

It has been found that the reaction is operable through a relatively wide temperature range and no critical limits for temperature have been established. However, while temperatures below 0° C. are operative, no advantage has been found in employing lower temperatures and likewise temperatures above about 50° C. are preferably avoided, since there is no advantage in their use, although the process is operative at temperature of 100° C. or even higher. When the temperature employed is above the boiling point of any of the reactants, the process can advantageously be carried out under superatmospheric pressure; otherwise, atmospheric pressure may be employed.

The products of this invention range from colorless, limpid to light yellow, viscous oils which are soluble in all common organic solvents and insoluble in water. They are useful as intermediates for further synthesis, for example for conversion by alcoholysis to the corresponding acetal of the oxocarbonyl compound. The mixed mercaptal-acetals of malonaldehyde can be converted to pyrazoles and pyrimidines by reaction with hydrazine and guanidines, respectively.

The following examples, in which parts are by weight, illustrate the specific embodiments of the invention:

Example 1

To a glass reactor fitted with a stirrer, thermometer, gas inlet tube and condenser was added 784 parts of ethyl tri-thioorthoformate and 0.25 part of boron trifluoride-diethyl ether complex. To this mixture was added with stirring 111 parts of methyl vinyl ether while maintaining the temperature at 30° C. during a period of 2 hours. The reaction mixture was then stirred for an additional half hour and 1 part of diethanolamine was added to neutralize the catalyst. Upon distillation of the reaction mixture, there was obtained a 57% yield of 1-methoxy-1,3,3-tri-thioethyl propane boiling at 122 to 131° C./3 mm. and having a $N_D^{25}$ of 1.5178. Analysis—Calculated for $C_{10}H_{22}OS_3$: C, 47.20; H, 8.72; S, 37.80. Found: C, 48.87; H, 8.50; S, 37.11. Lesser amounts of products resulting from the reaction of 2, 3, 4 and 5 moles of vinyl ether with one mole of orthothioester were also obtained.

1-methoxy-1,3,3 - triethylthiopropane can be converted to the tetramethyl acetal of malonaldehyde by refluxing with methanol containing a small amount of p-toluene sulfonic acid.

1-methoxy-1,3,3-trimethylthiopropane can be prepared by the reaction of methylthioformate with methyl vinyl ether.

Example 2

To a reaction vessel, similar to that described in Example 1, was added 167 parts of 2-ethylthio-dioxolane and 0.25 part of boron trifluoride-diethyl ether complex. To this mixture was added with stirring 54 parts of methyl vinyl ether while maintaining the temperature between 35 and 40° C. during a period of 2.25 hours. After the catalyst was neutralized by the addition of sodium methoxide, the reaction mixture was distilled to obtain 2-(3-methoxy - 3 - ethylthiopropyl)-dioxolane boiling at 117–123° C./2 mm.

I claim:

1. A mixed mercaptal-acetal of an oxocarbonyl compound of the formula

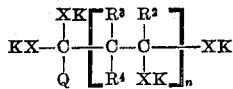

wherein $n$ is an integer within the range of 1 to 5, Q is selected from the group consisting of hydrogen and alkyl, aralkyl and aryl radicals, $R^2$, $R^3$ and $R^4$ are selected from the group consisting of hydrogen and alkyl, aralkyl and aryl radicals, X is a chalcogen of atomic weight less than 33, at least one of said X's being sulfur and K is selected from the group consisting of alkyl, aralkyl and aryl radicals.

2. 1-lower alkoxy-1,3,3-tri-lower alkyl thiopropanes, wherein the alkoxy and alkyl groups specified contain from 1 to 4 carbon atoms.

3. 1-methoxy-1,3,3-trimethylthiopropane.

4. 1-methoxy-1,3,3-triethylthiopropane.

5. The method of preparing mixed mercaptal-acetals of oxocarbonyl compounds containing two oxocarbonylic groups, which comprises reacting an $\alpha,\beta$-ethylenically-unsaturated ether of the formula:

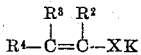

wherein $R^2$, $R^3$ and $R^4$ are selected from the group consisting of hydrogen and alkyl, aralkyl and aryl radicals and X is a chalcogen of atomic weight less than 33, K is a member of the group consisting of alkyl, aralkyl and aryl radicals, with an orthoester of the formula:

wherein Q is a member of the group consisting of hydrogen and alkyl, aralkyl and aryl radicals, one of the X's is sulfur, the remaining X's are chalcogens of atomic weight less than 33, and each of the K's is a member of the group consisting of alkyl, aralkyl and aryl radicals, in the presence of an acid-reacting condensing agent.

6. The method of preparing mixed mercaptal-acetals of oxocarbonylic compounds containing two oxocarbonylic groups, which comprises reacting an alkyl ether of an $\alpha,\beta$-ethylenically-unsaturated aliphatic alcohol with an orthoester of the formula

wherein Q is a member of the group consisting of hydrogen and alkyl, aralkyl and aryl radicals, one of the X's is sulfur, the remaining X's are chalcogens of atomic weight less than 33, and each of the K's is a member of the group consisting of alkyl, aralkyl and aryl radicals, in the presence of an acid-reacting condensing agent.

7. The method of preparing mixed mercaptal-acetals of oxocarbonylic compounds containing two oxocarbonylic groups, which comprises reacting a lower alkyl ether of an $\alpha,\beta$-ethylenically-unsaturated lower aliphatic alcohol said aliphatic alcohol having from 2 to 4 carbon atoms and said alkyl group of said ether having from 1 to 4 carbon atoms, with an orthoester of the formula

wherein Q is a member of the group consisting of hydrogen and alkyl, aralkyl and aryl radicals, one of the X's is sulfur, the remaining X's are chalcogens of atomic weight less than 33, and each of the K's is a member of the group consisting of alkyl, aralkyl and aryl radicals, in the presence of an acid-reacting condensing agent.

8. The method of preparing mixed mercaptalacetals of 1,3-oxocarbonylic compounds, which comprises reacting an alkyl vinyl ether with an orthoester of the formula

wherein Q is a member of the group consisting of hydrogen and alkyl, aralkyl and aryl radicals, one of the X's is sulfur, the remaining X's are chalcogens of atomic weight less than 33, and each of the K's is a member of the group consisting of alkyl, aralkyl and aryl radicals, in the presence of an acid-reacting condensing agent.

9. The method of preparing mixed mercaptalacetals of malonaldehyde, which comprises reacting a lower alkyl vinyl ether said ether containing from 1 to 4 carbon atoms in the alkyl group specified, with an orthoester of the formula

wherein Q is a member of the group consisting of hydrogen and alkyl, aralkyl and aryl radicals, one of the X's is sulfur, the remaining X's are chalcogens of atomic weight less than 33, and each of the K's is a member of the group consisting of alkyl, aralkyl and aryl radicals, in the presence of an acid-reacting condensing agent.

10. The method of preparing mixed mercaptalacetals of 1,3-oxocarbonylic compounds, which comprises reacting an alkyl ether of an $\alpha,\beta$-ethylenically-unsaturated aliphatic alcohol with an alkyl orthothioester of a fatty acid in the presence of an acid-reacting condensing agent.

11. The method of preparing mixed mercaptalacetals of 1,3-oxocarbonylic compounds, which comprises reacting a lower alkyl ether of an $\alpha,\beta$-ethylenically-unsaturated lower aliphatic alcohol said aliphatic alcohol having from 2 to 4 carbon atoms and said alkyl group of said ether having from 1 to 4 carbon atoms, with a lower alkyl orthothioester of a lower fatty acid containing from 1 to 4 carbon atoms, said orthothioester containing from 1 to 4 carbon atoms in the alkyl group specified, in the presence of an acid-reacting condensing agent.

12. The method of preparing mixed mercaptalacetals of malonaldehyde, which comprises reacting an alkyl vinyl ether with an alkyl orthothioformic ester in the presence of an acid-reacting condensing agent.

13. The method of preparing mixed mercaptalacetals of malonaldehyde, which comprises reacting a lower alkyl vinyl ether said ether containing from 1 to 4 carbon atoms in the alkyl group specified, with a lower alkyl orthothioformic ester said orthothioformic ester containing from 1 to 4 carbon atoms in the alkyl group specified, in the presence of an acid-reacting condensing agent.

JOHN W. COPENHAVER.

REFERENCES CITED

The following references are of record in the file of this patent:

UNITED STATES PATENTS

| Number | Name | Date |
|---|---|---|
| 2,229,651 | Hanford et al. | Jan. 28, 1941 |
| 2,327,966 | Morey | Aug. 24, 1943 |